(12) United States Patent
Smith et al.

(10) Patent No.: US 7,272,847 B2
(45) Date of Patent: Sep. 18, 2007

(54) SYSTEM FOR RETURN BANDWIDTH MINIMIZATION USING SELECTIVE SAMPLING

(75) Inventors: Patrick Smith, Deerfield, IL (US);
Timothy Burke, Norton, MA (US);
Daniel Grossman, Norwood, MA (US);
Patrick Maurer, Wayland, MA (US)

(73) Assignee: Motorola, Inc., Schaumburg, IL (US)

( * ) Notice: Subject to any disclaimer, the term of this patent is extended or adjusted under 35 U.S.C. 154(b) by 1282 days.

(21) Appl. No.: 10/162,461

(22) Filed: Jun. 4, 2002

(65) Prior Publication Data

US 2003/0223460 A1 Dec. 4, 2003

(51) Int. Cl.
*H04N 7/173* (2006.01)
(52) U.S. Cl. .................... 725/129; 725/118; 725/119; 725/121; 725/127

(58) Field of Classification Search ................ 370/286, 370/486–487, 396, 395.52; 725/105, 117–122, 725/124–125, 127, 130, 114, 129; 709/201–203
See application file for complete search history.

(56) References Cited

U.S. PATENT DOCUMENTS

| 5,627,836 | A | * | 5/1997 | Conoscenti et al. | ........ 370/397 |
| 5,915,205 | A | * | 6/1999 | Chen | ........................... 725/125 |

* cited by examiner

*Primary Examiner*—Ngoc Vu (57) ABSTRACT

In a cable television system a system for supporting SCU return in FTTB-MDU and FTTC/FTTcab configurations. Fiber, baseband transceiver and networking capabilities are shared with data and voice portions of the system for enabling communication from the SCUs to the HE over a packet based networking system. Return packets/upstream packets are passed into the network upstream channel only when a signal is present for eliminating transmission of upstream traffic that contains no signal for conserving upstream bandwidth.

48 Claims, 6 Drawing Sheets

SYSTEM FOR RETURN BANDWIDTH MINIMIZATION USING SELECTIVE SAMPLING

FIELD OF THE INVENTION

The present invention relates generally to a cable television system and, more particularly, to connectivity of a cable distribution network with a packet network and efficient return of upstream data through the use of existing protocols.

BACKGROUND OF THE INVENTION

In a cable television system, broadcast video, video-on-demand, telephony and Internet access are presently delivered over coaxial cable. However, there is a need to deliver these services over optical fiber to multiple dwelling units (MDUs), such as apartment buildings/flats, condominiums, row houses, dorms etc. and to detached dwellings in fiber-to-the-curb or fiber-to-the-cabinet (FTTC/FTTcab) configurations. This need is principally due to certain costs and capacity limitations in the Data over Cable Service Interface Specification (DOCSIS) technology, which presently is used to deliver Internet access to subscribers over cable.

A particular problem in fiber-to-the-building for MDU (FTTB-MDU), FTTC/FTTcab configurations is support of return traffic from existing subscriber communications units (SCU), such as set-top boxes, where the existing SCUs may not be optimized for use in the FTB-MDU and FTTC/FTTcab configurations.

Broadcast television and on-demand video is presently delivered to subscribers over coaxial cable. The SCUs mediate subscriber access to video services, such as premium channels, pay-per-view and electronic program guides. Both digital and analog SCUs use the return path for interactive services (such as pay-per-view) and for status monitoring. In existing cable television systems, the return path is a frequency band (e.g., from 7 MHz to 42 MHz) which is configured to be transported from the SCUs to the headend (HE). Cable operators have a very large investment in SCUs and corresponding headend equipment, and need to use them without modification in FTTB-MDU and FTTC/FTTcab configurations. Attempts have been made and are continuing to be made in an attempt to support SCU return in FTTB-MDU and FTTC/FTTcab systems. That is, to support legacy cable system SCUs in a packet based system.

In one particular system, a digital return is implemented for the entire upstream band, as is presently done in optical nodes in existing cable television systems. That is, the entire upstream band is sampled (i.e., at least at the Nyquist rate) and transported as a stream of digitized samples. However, the wideband requirement of such a system requires high-speed digital transmission, typically over a separate fiber. Required wideband analog-to-digital converters (ADC) at a high cost also are required. Further, such an approach is wasteful, since SCUs transmit infrequently and do so over a relatively small portion of the spectrum. As a variant of this approach, a smaller portion of the upstream band could be digitized, though at the loss of generality and network flexibility, and with little gain in efficiency.

In an alternate system, a digital return is implemented for a single upstream channel. This requires all SCUs served by the FTTB-MDU or FTTC node (but not necessarily every SCU in the system) to be configured by the operator to use the same upstream channel, without frequency hopping. This also requires that all systems work with the same protocol exclusively. Thus, system level flexibility and generality is lost. Again, there remains inefficient use of the return channel due to transmission of sampled data when no signal is present.

In another system, the return demodulation is performed locally and encapsulates the recovered data packets in standardized data packets (e.g., IP datagrams or Ethernet frames), as done in existing headends. This "packetized" data is then sent upstream via the packet network where the resulting requests are processed at the headend. Unfortunately, a different demodulator is needed for each system supported. In addition, the solution at the headend is highly dependent upon an ability to forward recovered data packets, possibly encapsulated in IP or Ethernet in some proprietary way, to proprietary interactive TV controller systems.

In still another system, the entire 7-42 MHz band is amplitude modulated and transmitted as an optical signal over an optical fiber toward the headend. Unfortunately, a second optical fiber, an analog optical transmitter and an analog optical receiver for each FTTH-MDU or FTTC unit is required. Further, analog optical components are significantly more expensive than digital optical components, thereby increasing the cost.

BRIEF DESCRIPTION OF THE DRAWINGS

Other objects and advantages of the invention will become apparent upon reading the following detailed description and upon reference to the drawings, in which.

DETAILED DESCRIPTION

The present invention generally provides for supporting SCU return in FTTB-MDU and FTTC/FTTcab configurations in a cable television system in a cost efficient manner. The fiber, baseband transceiver and networking capabilities are shared with the data and voice portions of the system, thereby enabling communication from the SCUs to the HE over a packet based networking system. A particular advantage of such a system is the ability of cable operators to continue using existing SCUs in FTTB-MDU and FTTC/FTTcab configurations without requiring the SCUs to be replaced or modified. Accordingly, the potential exists for cable operators to realize significant cost savings, and yet still take advantage of the increased capability of fiber based solutions. A further advantage of such a system is that all communication between the FTTB-MDU, FTTC or FTTcab node and the feeder network can be accomplished over a single optical fiber, i.e., using one wavelength in the downstream direction for broadcast video, another wavelength in the downstream direction for data and telephony, and one wavelength in the upstream direction for data, telephony and set-top return. Use of a single fiber can greatly reduce capital cost in building such a system.

In a particular embodiment, the cable television system provides a digital return for band limited upstream traffic where return packets/upstream packets are passed into the network upstream channel only when a signal is present. Thus, the use of a selective sampler, as described further below, eliminates transmission of upstream traffic that contains no signal, thereby conserving upstream bandwidth. An additional advantage is that by sending only valid signals, selective sampling in effect removes the vast majority of noise and interference appearing at the headend. This can provide benefits such as a greatly simplified receiver, or a large increase in the number of SCUs served by each receiver. Furthermore, selective sampling is not subject to the stringent delay jitter constraints of blindly streaming samplers, rendering it more amenable to common methods of packetized, asynchronous transport.

Advantageously, the packetized data is capable of being routed to virtually any type or number of devices on the network. Therefore, translation of the data back into its original form is not limited to a single point, or a single translation, in a given system. This allows for future network configurations without loss of generality. For example, a selective sampler could sample one or more protocols simultaneously and deliver their packetized data to two or more requesting devices anywhere in the network. Alternately, the selective sampler could classify signals using features distinct to a known modulation, and forward to different destinations accordingly. Signals are classified using features present in each class of digital modulation and largely absent from other signal classes. In addition, the selective sampler is able to classify signals into a last-resort category if the signal can not be classified into any known class.

In another aspect, multiple upstream channels may be accommodated, if required, by sampling each channel separately at a channel rate limited intermediate frequency (IF) bandwidth. Alternatively, several lower rate carriers may be accommodated simultaneously by digitizing the multiple upstream channels and selectively filtering them through a bank of digital filters. Additionally, the number of samples a given carrier requires for accurate signal reconstruction at the headend may be minimized for greater flexibility.

Figure 1:
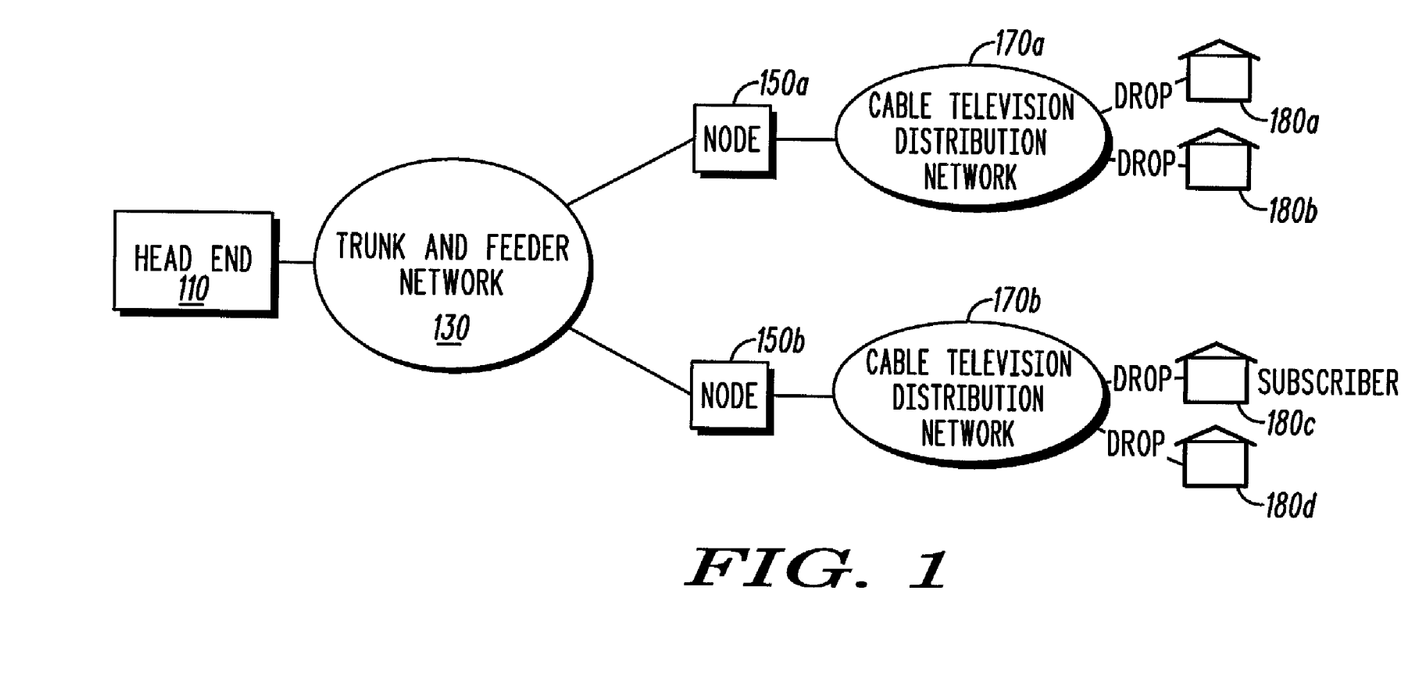
FIG. 1 is a high level block diagram of a cable system in accordance with an embodiment of the invention.

The present invention can be more fully understood with reference to FIGS. 1-7. FIG. 1 is a high level block diagram of a cable system 100 in accordance with an embodiment of the invention. The cable system 100 comprises a headend 110 in communication with a trunk and feeder network 130 for transmitting a plurality of signals and receiving a plurality of signals. One or more downstream nodes 150a, 150b are connected to the trunk and feeder network 130 for distributing communications services over the cable television distribution network 170a, 170b. Subscriber locations 180a, 180b, 180c, 180d are connected by drop cables to the cable television distribution network 170a, 170b for receiving the communications services distributed by the cable television distribution network 170a, 170b. The downstream nodes also may function as an upstream node to collect upstream signals from the subscriber communications units and communicate them to the headend 110 via the trunk and feeder network 130.

Advantageously, the headend 110 is configured to execute a variety of network physical management functions, including spectrum management, to increase throughput by reducing or preempting data packet collisions. The headend 110 uses frequency reuse to shift the frequency of the received data packets. As such, the data packets, which originate at set-top boxes, are placed anywhere within the frequency spectrum in an attempt to reduce data packet collision that may occur when data packets from the many set-top boxes at the same frequency arrive simultaneously at the headend 110. For example, if data packets from one-hundred SCUs arrive at the headend 110 simultaneously, by putting the packets on four separate carriers, there is that much less likelihood of collision. Alternatively, four times the number of data packets maybe handled by the headend 110 at the same level of collision. In either case, throughput is significantly increased. In a similar network physical management function, packet collision preemption also is achieved by shifting packets in time at the reconstruction unit, such as the headend 110, before entry to the legacy headend interactive system demodulator/decoder.

Figure 2:
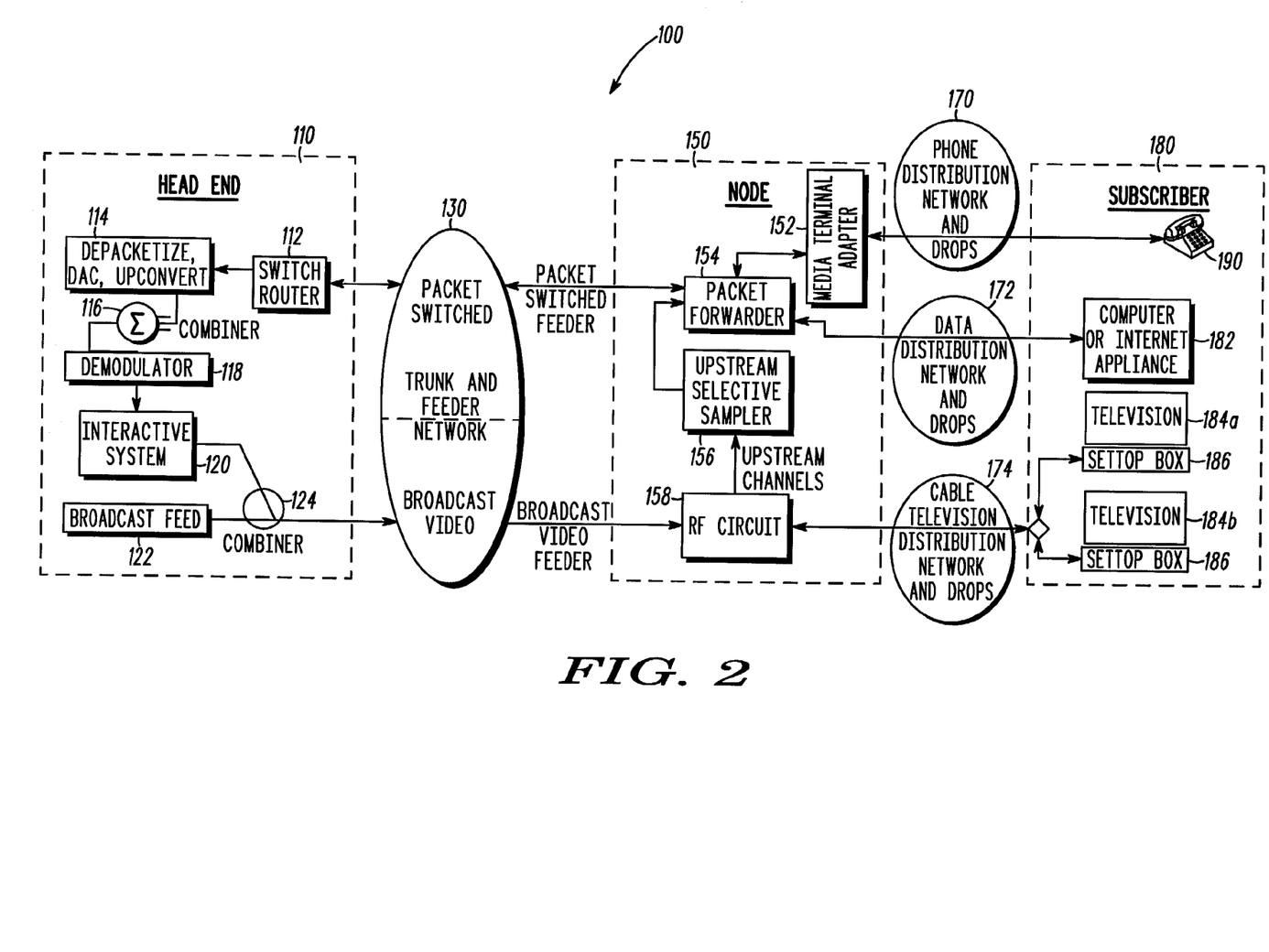
FIG. 2 is a detailed block diagram of the cable system of FIG. 1 in accordance with an embodiment of the invention.

FIG. 2 is a detailed block diagram depiction of the cable system 100 of FIG. 1 in accordance with the present invention. The headend 110 comprises a switch/router 112 in communication with a digital return terminal 114. The switch/router 112 receives signals from the packet switched portion of the trunk and feeder network 130. The digital return terminal 114 comprises a defragmenter, buffer, depacketizer, upconverter and at least one digital-to-analog converter, none of which need be shown in describing the cable system of the present invention. Output from the digital return terminal 114 is fed into a combiner 116 and combined with other signals. The output from the combiner 116 is then demodulated in demodulator 118 before being input into an interactive system 120. Output from the interactive system 120 is combined in combiner 124 with output from a broadcast feed 122, where the broadcast feed contains one or more signals, and the combined signal is then sent out of the headend 110 and onto the broadcast video portion of the trunk and feeder network 130. The trunk and feeder network 130 is configured to send and receive packet switched data upstream and downstream on the packet switched portion, and also to send broadcast data downstream on the broadcast video portion. The trunk and feeder network 130 interfaces to the headend 110 via an optical trunk link.

The FTTB-MDU (or FTTC/FTTcab) node 150, which connects to the trunk and feeder network 130 comprises a layer 2/layer 3 packet forwarder 154 and an upstream selective sampler 156 for sampling upstream data and for determining whether the sampled upstream data includes a signal. A radio frequency (RF) circuit 158 also is provided for transmitting signals through one or more upstream channels to the upstream selective sampler 156. The upstream selective sampler 156 determines whether a signal is present in the upstream data and converts the sampled data into a packet form for transmission by the packet forwarder 154 over the trunk and feeder network 130.

If the node 150 is configured to provide telephony services, it further comprises a media terminal adapter 152. The media terminal adapter 152 is configured to both send and receive packet data directly from the packet forwarder 154 and to provide an interface to a conventional analog telephone.

The subscriber location 180 includes at least one of many different devices that communicate over the cable network, which is able to provide many services including voice telephone service, internet access and cable television. Accordingly, the consumer devices include such things as a telephone 190, a computer or internet appliance 182, and an SCU 184 connected to a television 186. Each of the devices interfaces to the cable system via a distribution network and drop. In particular, the telephone 190 communicates with the media terminal adapter 152 of the node 150 through the phone distribution network and drop 170. The computer or internet appliance 182 is connected to the packet forwarder 154 through a data distribution network and drop 172. Similarly, the SCU 186 communicates with the RF circuit 158 through a cable television distribution network and drop 174. A particular advantage of the present system, as mentioned above, is the ability to use the same type of SCUs used in prior cable television applications, thereby preserving the cable company's investment in the hardware.

In accordance with the cable system 100, in a particular embodiment a digital return is provided for band limited upstream traffic for a single upstream channel. All of the SCUs served by the FTTB-MDU or FTTC node are configured by the cable operator to use the same upstream channel. However, to limit the use of bandwidth, signals are packetized and these packetized return signals are passed into the network only when carrier is present, thereby increasing the efficiency of the system. This is accomplished using the selective sampler 156 (FIG. 2). In particular, the selective sampler 156 determines the presence of a signal in one of many ways. For example, the presence of a signal is determined using features common to a plurality of signal classes; using signal features present in at least one digital modulation scheme, but largely absent from one or more known interference patterns; using features present in one or more known interference patterns, but largely absent from signal; or using features unique to one class of digital modulation.

The selective sampler 156 can be viewed as the first stage of a complete decoder, with the addition only of some control logic, thereby requiring relatively less memory and computational complexity than many other available solutions. This capacity is required irrespective of utilization. Performing complete decoding at the headend rather than the MDU represents a cost and complexity savings due to aggregation.

Because the MDU node 150 is network connected, a particular advantage of the selective sampler 156 is its ability to adapt to predetermined operating conditions or to be configured remotely. This is accomplished by sending the MDU a data packet having a predefined header that is recognized by the selective sampler 156 as containing configuration information. Upon receiving the configuration data packet, the selective sampler 156 is reconfigured with the new parameters in the data packet. For example, a service technician or other authorized personnel is able to initiate a file transfer protocol (FTP) session to the MDU 150 and transfer the configuration file for changing the thresholds or algorithms of the selective sampler 156.

In another aspect, remote monitoring is implemented in conjunction with the selective sampler 156. A network connected monitoring function is configured to examine the physical or network signal characteristics of data packets sent to the remote monitor by the selective sampler 156. For example, the headend 110 instructs the selective sampler 156 to send either all valid traffic or all traffic from the MDU 150 to the monitor to check for system level history or other system related information. The instructions to the selective sampler 156 to forward packets maybe sent in the form of configuration data packets to change the operation of the selective sampler 156, as discussed earlier.

In addition, the selective sampler 156 addresses legacy equipment functionality and is transparent to the source and destination of the communication path, thus allowing a flexible, piecemeal equipment upgrade schedule. Accordingly, referring to FIG. 3, the upstream selective sampler 156 includes a tuner portion comprising a band pass filter (BPF) 200, a pair of mixers 202, 208, an intermediate filter (IF) 204 and an analog-to-digital converter (ADC) 218. A memory element 220, such as a FIFO, is provided for storing the output 222 of the ADC 218. The contents of the memory element 220 are processed and then packetized and forwarded to the layer 2/layer 3 forwarder 170. From the forwarder 170, the signal is sent to the optical transceiver 164.

Figure 3:
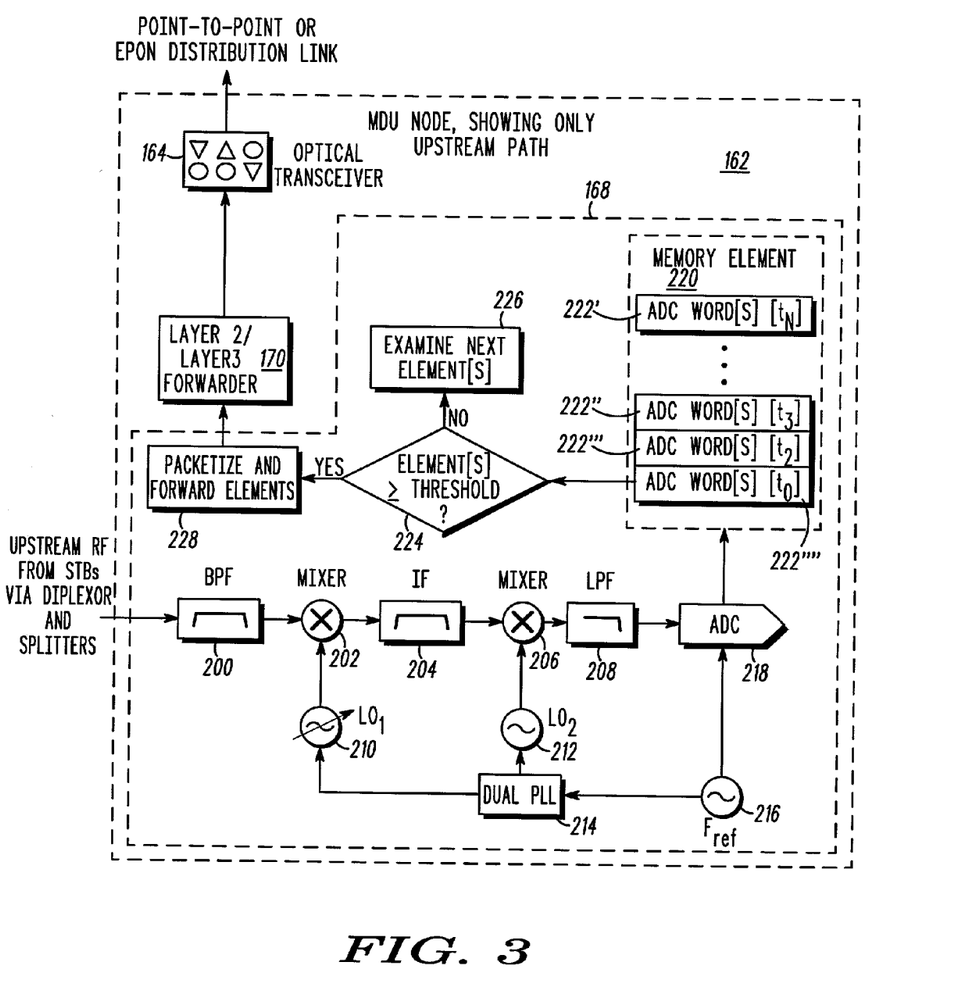
FIG. 3 is a block diagram of an upstream selective sampler in accordance with an embodiment of the invention.

It is to be noted that although the upstream selective sampler 156 is described and shown herein in terms of discrete components for ease of understanding, similar or identical functionality may be achieved through the use of a digital signal processor (DSP) or a microprocessor or microcontroller.

The selective sampler may be implemented in the FTTB-MDU node or FTTC/FTTcab node 150 (FIG. 2) and may be provisioned to work over multiple carriers, and with frequency hopping through digital filtering. Optimization, or selective sampling, is performed by the local single channel sampler 156 performing ADC conversion actions using the ADC 218 over all time and placing the sampled signal in the memory array 220. In operation, stored data 222 is evaluated in step 224 to determine whether a signal is present. An energy detector maybe used for such a purpose, although various other solutions are available as well.

If a signal or carrier is present, then the signal stored in the memory array 222 is packetized for delivery over the network. A lack of carrier, if determined in step 226, causes the next element of stored data 222'', 222''' to be read and evaluated. In this approach, for a 192 kHz channel, network traffic is of the order of [the on/off ratio of the population of SCUs]×[2(selective sampler's ADC sample rate)]×[192 kHz]×[8(number of bits in the ADC)]. It is to be noted that the values set forth in the previous equation are by way of example only and are system dependent. Since the on/off ratio of each SCU is miniscule, the traffic load at the FTTB-MDU or FTTC node is very small. Even if oversampling is needed, the traffic load remains insignificant. With a jitter buffer 122 at the headend 110, jitter bounds, if needed at all, are likely to be generous. Advantageously, this approach works with any interactive video system without modification. By selective sampling, only active bands are sent, thereby minimizing traffic over the upstream channel. Unlike a full decoder/re-encoder, the selective sampler 156 is protocol independent, minimizing exposure to conformance conflicts or the need to reverse-engineer proprietary return path communication systems.

In another aspect of the invention, the requirement for multiple upstream channels is addressed. In a particular embodiment, several independent selective sampling receivers 156 (FIG. 3) are provided for sampling each single channel at a channel rate limited IF bandwidth. Alternatively, the IF bandwidth of the selective sampling receiver is increased to accommodate several lower rate carriers simultaneously and perform single channel selective filtering through a parallel bank of digital filters.

Figure 4:
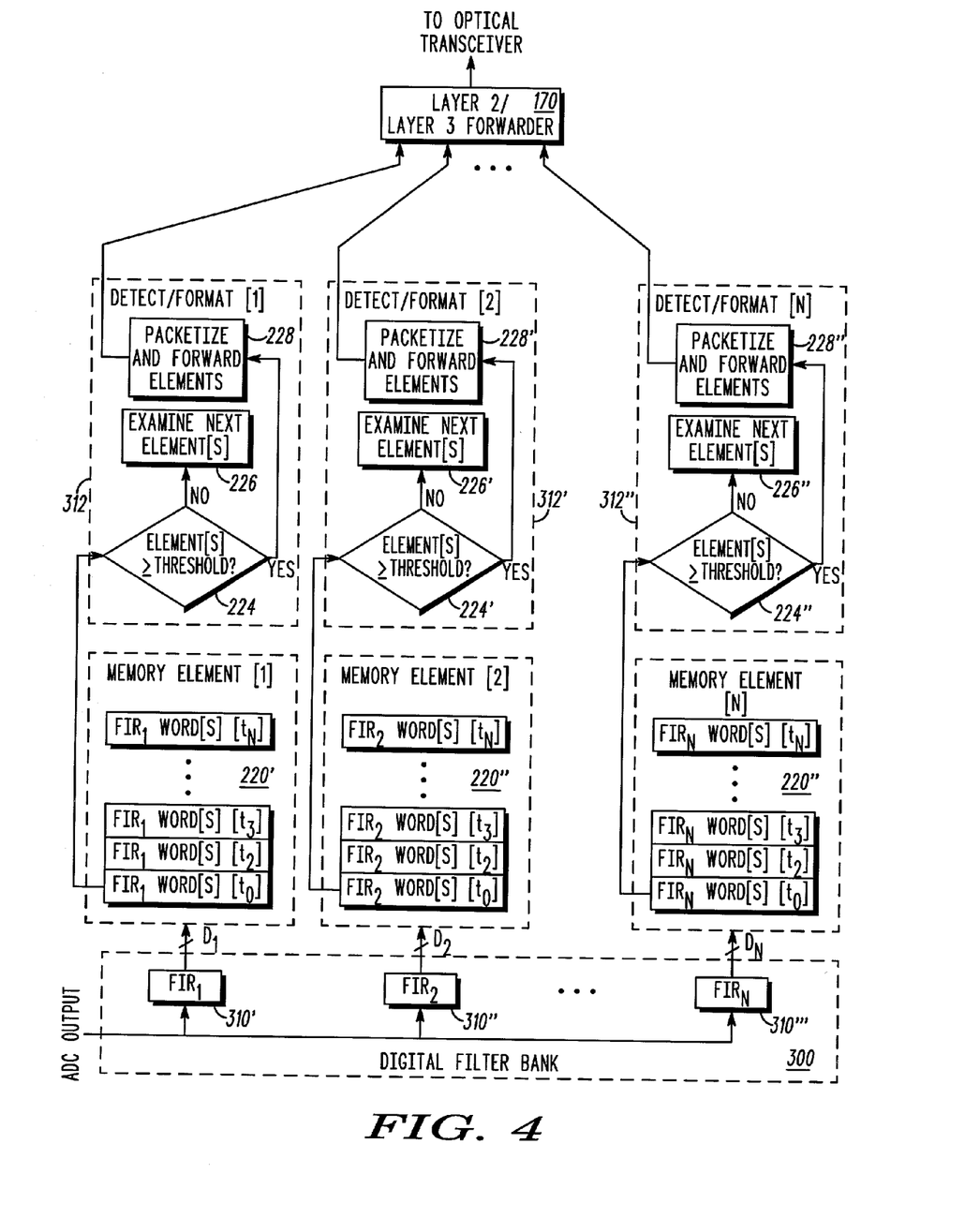
FIG. 4 is a block diagram of an upstream selective sampler in accordance with an alternate embodiment of the invention.
Figure 6:
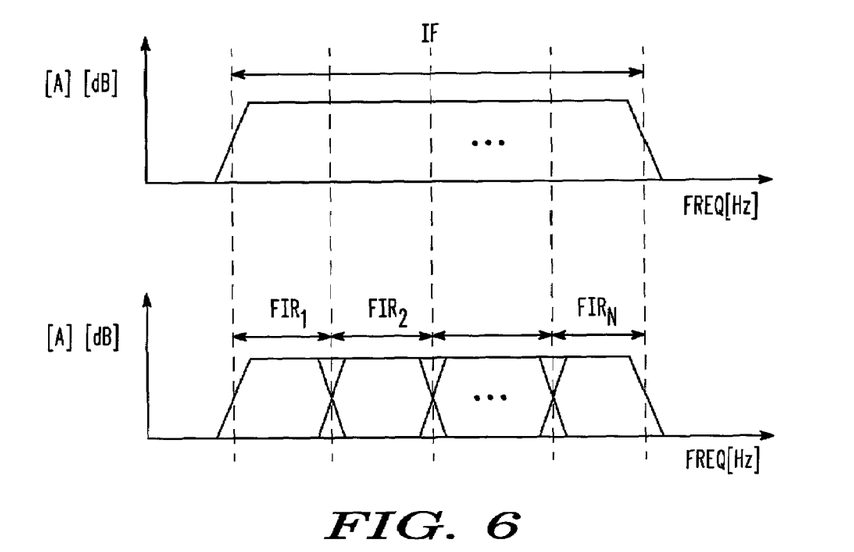
FIG. 6 is a waveform illustrating the upstream selective sampler's multi-channel spectra.

Turning now to FIG. 4, the upstream selective sampler 156 is shown configured for use with multiple upstream channels, as described above. The upstream selective sampler 156 comprises a digital filter bank 300 comprising a plurality of FIRs 310', 310'', 310'''. The digital filter bank 300 receives output from the ADC 218 (FIG. 3) and feeds the signal into the plurality of FIRs 310', 310'', 310'''. The output of each of the FIRs is then input into a plurality of memory elements 220', 220'', 220'''. The outputs from the memory elements 220', 220'', 220''' are first processed in the detect/format blocks 312, 312', 312". That is, data stored in the memory elements 220', 220", 220'" is evaluated in step 224 to determine whether a signal is present. If a signal or carrier is present, then the signal stored in the memory element 220 is packetized and forwarded to the layer 2/layer 3 forwarder 170 for delivery over the network, as described with regards to FIG. 3. If a lack of carrier is determined in step 226, the next element of data stored in the memory element 220 is read and evaluated. The resulting frequency response is shown in FIG. 6. Again, the above functions maybe performed by a DSP or other microprocessor based computing device. A particular advantage of the multiple upstream channel system as described above is that the independence of the channels is preserved. Further, it allows for IF bandwidth limited frequency hopping and/or multiple carriers to be present without loss of applicability or generality.

Figure 5:
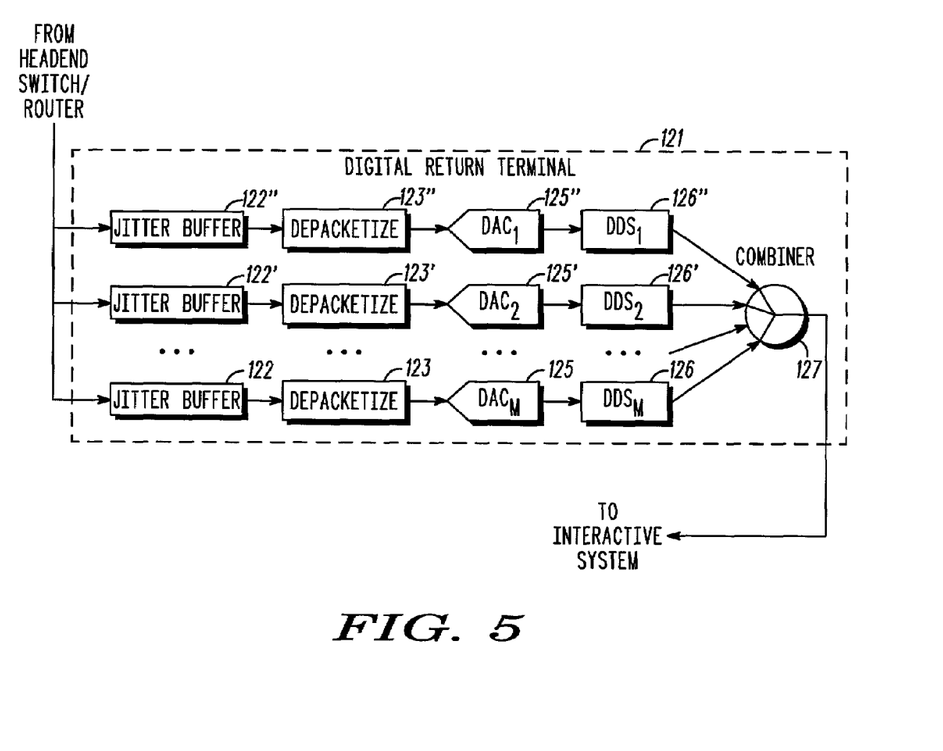
FIG. 5 is a block diagram of a digital return terminal in accordance with an embodiment of the invention.
Figure 7:
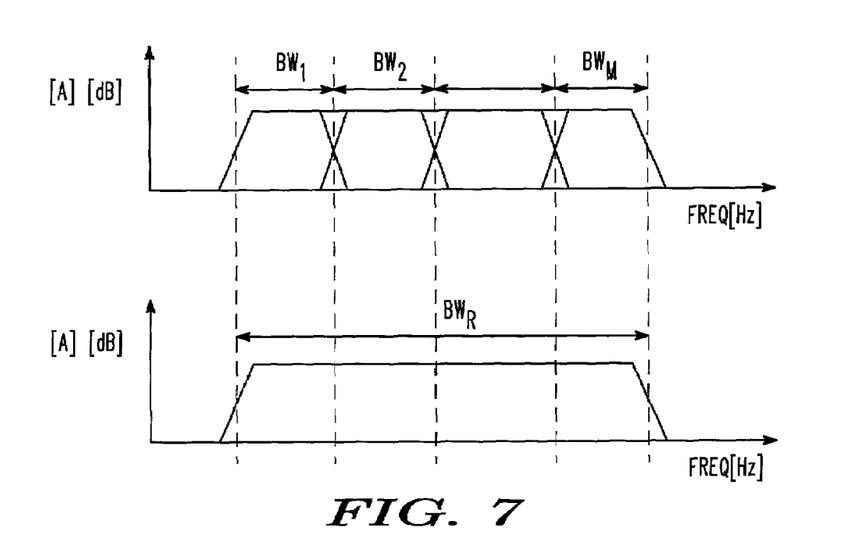
FIG. 7 is a waveform illustrating the upstream selective sampler's multi-channel reconstruction spectra.

Continuing to refer to FIG. 4, the selective sampler 156 may be provisioned to lower the effective bit rate, through digital decimation, to the minimum required to reconstruct the signal in a multi-carrier environment. Additional flexibility is gained by implementing a system for performing digital decimation by D after each FIR filtering stage. Decimation is performed to minimize the number of samples a given carrier requires for accurate signal reconstruction at the headend, as shown in FIG. 5. In particular, a digital return terminal 121 is shown in FIG. 5 comprising a plurality of jitter buffers 122, 122', 122" for receiving signals from the headend 110. A plurality of depacketizers 123, 123', 123" receive the signals from the jitter buffers and output digital signals for input into a plurality of digital-to-analog converters (DAC) 125, 125', 125". The converted signals are the fed into a plurality of direct digital synthesizers (DDSs) and the outputs from the DDSs are subsequently input into a combiner 127. A single signal, then, from the combiner 127 is sent to the interactive system 120 (FIG. 2). The resulting frequency response is shown in FIG. 7. Thus, another advantage of selective sampling is that samples that contain noise but not carrier are discarded. Noise that is suppressed at the FTTC-MDU or FTTC/FTTcab node is not added in the combiner 124, as shown in FIGS. 1, 4 and 6, and thus does not appear at the demodulator. The noise floor at the demodulator is thereby lowered in systems with significant FFTB or FTTC deployment.

The decimation system thus can be said to optimize for minimum bit level traffic per carrier. The design of the IF optionally is configured such that 1.544 Msps as well as 192 ksps is supported. Note that as the IF bandwidth approaches the entire system's upstream bandwidth, the choice of ADC is adjusted to accommodate the potential extra power of the system, thereby avoiding ADC saturation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A communications system, comprising:
    a trunk and feeder network;
    a cable television distribution network;
    a headend connected to the trunk and feeder network for transmitting one or more signal over at least one downstream channel and receiving one or more signal over at least one upstream channel;
    at least one downstream node connected to the trunk and feeder network for distributing communications services over the cable television distribution network to at least one subscriber premises;
    at least one upstream node connected to the cable television distribution network for collecting upstream signals from at least one subscriber communications unit, converting said upstream signals to packet form and communicating said packets to the headend via the trunk and feeder network; and
    a subscriber communications unit for receiving downstream channel signals and for transmitting upstream channel signals, the subscriber communications unit receiving and transmitting the upstream and downstream channel signals over a connection connecting the subscriber communications unit and the node.

2. The communications system of claim 1, further comprising a selective sampler in the upstream node for sampling upstream data and for determining whether the sampled upstream data includes a signal.

3. The communications system of claim 1, wherein the upstream node and downstream node are co-located.

4. The communications system of claim 2, wherein the sampled data is converted into a packet form and transmitted over the trunk and feeder network when the selective sampler determines a signal to be present.

5. The communications system of claim 4, wherein, to reduce the noise appearing at the headend, the data packet is transmitted when the selective sampler determines the presence of a signal in the sampled data.

6. The communications system of claim 4, wherein, to reduce the interference appearing at the headend, the data packet is transmitted when the selective sampler determines the presence of a signal in the sampled data.

7. The communications system of claim 4, wherein, to increase the efficiency of use of the upstream channel, the data packet is transmitted when the selective sampler determines the presence of a signal in the sampled data.

8. The communications system of claim 4, wherein, to enable aggregation of upstream traffic, the selective sampler determines the presence of a signal in the sampled data.

9. The communications system of claim 2, wherein the selective sampler determines the presence of a signal using features common to a plurality of signal classes.

10. The communications system of claim 2, wherein the selective sampler determines the presence of a signal using signal features present in at least one digital modulation scheme and largely absent from one or more known interference patterns.

11. The communications system of claim 2, wherein the selective sampler determines the absence of a signal by using features present in one or more known interference patterns and largely absent from signal.

12. The communications system of claim 2, wherein the selective sampler determines the presence of a signal using features unique to one class of digital modulation.

13. The communications system of claim 2, wherein the selective sampler classifies signals using features present in each class of digital modulation and largely absent from other signal classes.

14. The communications system of claim 13, wherein the selective sampler classifies signals into a last-resort category upon failure to classify into a known class.

15. The communications system of claim 13, wherein the upstream node forwards signals to a destination based on classification by the selective sampler.

16. The communications system of claim 1, wherein the upstream node is configured to deliver data in packet form to requesting devices.

17. The communications system of claim 1, wherein the upstream node is configured to deliver data in packet form to a plurality of devices.

18. The communications system of claim 16, wherein the requesting devices are located in the headend.

19. The communications system of claim 16, wherein the requesting devices are connected to the trunk and feeder network.

20. The communications system of claim 16, wherein the requesting devices are connected through the headend.

21. The communications system of claim 2, wherein the upstream node also transmits information pertinent to aiding the headend in reconstruction of the signal.

22. The communications system of claim 1, wherein the subscriber communications unit is used to mediate subscriber services.

23. An interactive communications system, comprising:
at least one set-top box at a subscriber location for mediating subscriber services;
a node arranged to serve at least one subscriber location;
a headend for sending downstream signals to, and receiving upstream signals from, the set-top box by way of the node;
a first downstream channel for carrying a first predetermined type of data from the headend to the set-top box by way of the node; at least one second downstream channel for carrying a second predetermined type of data from the headend to the set-top box by way of the node;
an upstream channel for carrying return data from the set-top box to the node;
a two-way packet data communications channel, having an upstream and a downstream direction, for carrying packets of data from equipment in the subscriber location to the headend by way of the node, wherein the packet data communications channel is a part of a packet data communications network; and
a selective sampler for inserting data from the upstream channel into the data communications channel in the upstream direction.

24. The interactive communications system of claim 23, wherein the selective sampler packetizes the return data from a set-top box for enabling communications between a set-top box arranged for conventional two-way cable television services and a headend arranged for conventional two way cable television services over a packet data communications network.

25. The interactive communications system of claim 24, wherein for conserving upstream bandwidth, the selective sampler converts all data in the upstream channel and inserts the data into the packet data communications channel in the upstream direction only if the return data includes a signal.

26. The interactive communication system of claim 24, wherein the selective sampler fragments packets that are longer than a selected size into a plurality of smaller fragment packets and the headend reassembles the fragmented packets into full packets.

27. The interactive communications system of claim 23, wherein the node that contains the selective sampler is located in a multiple dwelling unit that is connected to the headend through optical fiber in a fiber-to-the building MDU-configuration.

28. The interactive communications system of claim 23, wherein the node that contains the selective sampler is located at a detached dwelling and is connected to the headend through optical fiber in a Fiber-to-the-Home configuration.

29. The interactive communications system of claim 23, wherein the node that contains the selective sampler is located in a curbside enclosure and is connected to the headend through optical fiber in a Fiber-to-the-Curb configuration.

30. The interactive communications system of claim 23, wherein the node that contains the selective sampler is located at a conventional optical node.

31. The interactive communications system of claim 23, further comprising a plurality of upstream channels for carrying return data from the set-top box to the headend, wherein multiple sampling receivers are provided for sampling corresponding multiple upstream channels.

32. The interactive communications system of claim 31 wherein the multiple selective sampling receivers are independent and sample each channel at a channel rate limited IF bandwidth.

33. The interactive communications system of claim 23 wherein the selective sampling receiver is configured with a predetermined TF bandwidth for enabling a plurality of upstream channels to be digitized.

34. The interactive communications system of claim 33 further comprising a bank of digital filters through which multiple upstream channels are filtered for optimizing transmission of a plurality of lower rate signals over the upstream channels.

35. The interactive communications system of claim 34 further comprising means for minimizing the number of samples taken of each upstream channel to a minimum value required to reconstruct the signal.

36. The interactive communications system of claim 23, wherein the selective sampler is configured as a system monitoring tool.

37. The interactive system of claim 23, wherein the headend comprises a switching node, LAN, depacketizer, defragmenter, demodulator and interactive system.

38. The interactive communications system of claim 23, wherein the first downstream channel is a control channel for carrying control information.

39. The interactive communications system of claim 23, wherein the second downstream channel is configured to carry audiovisual programs.

40. A method of communication in a cable television distribution network comprising the steps of:
transmitting one or more signal over at least one downstream channel and receiving one or more signal over at least one upstream channel;
distributing communications services over the cable television distribution network to at least one subscriber premises;
collecting upstream signals from at least one subscriber communications unit, converting said upstream signals to packet form and communicating said packets to a headend via a trunk and feeder network; and
receiving downstream channel signals and transmitting upstream channel signals over a connection connecting the subscriber communications unit and a node.

41. The method of claim 40, further comprising the step of packetizing the return data from the subscriber communications unit for enabling communications between the subscriber communications unit arranged for conventional two-way cable television services and a headend arranged for conventional two-way cable television services over a packet data communications network.

42. The method of claim 40, further comprising the step of converting all data in the upstream channel into packet data and inserting the packet data into a packet data communications channel in the upstream direction if the return data includes a signal.

43. The method of claim 40, further comprising the step of shifting the data packet in frequency for preempting packet collision and increasing throughput.

44. The method of claim 40, further comprising the step of shifting the data packet in time for preempting packet collision and thereby increasing throughput.

45. The method of claim 40, further comprising the step of reducing the noise appearing at the headend upon determining the return data includes a signal.

46. The method of claim 40, further comprising the step of reducing the interference appearing at the headend upon determining the return data includes a signal.

47. The method of claim 40, further comprising the step increasing the efficiency of use of the upstream channel by transmitting the data packet upon determining the return data includes a signal.

48. The method of claim 40, further comprising the step of aggregating upstream traffic upon determining the return data includes a signal.

* * * * *